Patented Aug. 8, 1933

1,921,361

UNITED STATES PATENT OFFICE 1,921,361

WATER INSOLUBLE AZODYESTUFF AND FIBER DYED THEREWITH

Leopold Laska and Arthur Zitscher, Offenbach-on-the-Main, Germany, assignors to General Aniline Works, Inc., New York, N. Y., a Corporation of Delaware No Drawing. Application August 22, 1929, Serial No. 387,793, and in Germany August 25, 1928

27 Claims. (Cl. 260—84)

Our present invention relates to new water-insoluble azodyestuffs and to fiber dyed therewith; more particularly it relates to azodyestuffs corresponding probably to the general formula:

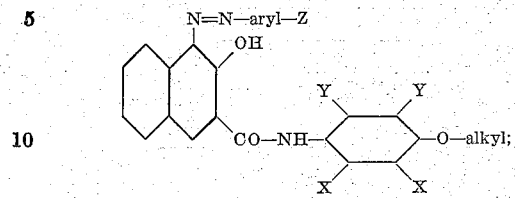

wherein one X means hydrogen and the other X a methoxy-group, one Y stands for hydrogen and the other Y for hydrogen, alkyl, alkoxy or halogen, Z stands for hydrogen, the residue —N=N—aryl or the residue

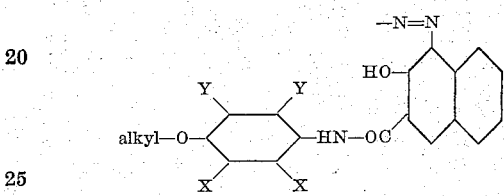

wherein X and Y have the above indicated meaning and aryl represents the residue of an aromatic diazotizable amino compound not containing any groups, such as the sulfonic acid or the carboxylic acid group, which would render the dyestuffs soluble in water or alkalies. The new compounds are obtainable by combining in substance or on a substratum, particularly on the fiber any diazo-, tetrazo- or diazoazo-compound not containing any groups, such as the sulfonic acid or the carboxylic acid group, which would render the dyestuffs soluble in water or alkalies, with a 2.3-hydroxynaphthoyl-4-amino-benzene-compound of the general formula:

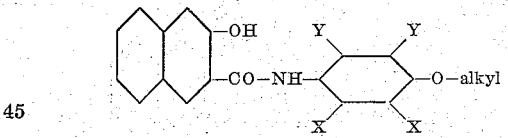

wherein the X's and Y's have the aforesaid signification. The new dyestuffs may be used for the production of valuable color lakes; when produced on the fiber they yield fast dyeings and printings. Compared with the known dyestuffs derived from 2.3-hydroxy-naphthoyl-4-amino-1-alkoxybenzenes the new dyestuffs are distinguished by a better fastness to light: the presence of the methoxy-group in the 2- or 3-position of the arylide residue increases the fastness to light to such an extent that even when simple and cheap diazocomponents, such as for example meta-xylidine, are used dyestuffs of a remarkably good fastness to light are obtained. By the introduction of yet another substituent (alkyl, alkoxy, halogen) into the arylide residue the fastness to light is in some cases further improved.

The dyeings thus obtainable can be rendered still more fast to light by an aftertreatment with metallic salts, such as, for instance, copper salts.

In order to further illustrate our invention, the following examples are given, the parts being by weight and all temperatures in centigrade degrees. We wish it however to be understood that we are not limited to the particular products or reaction conditions mentioned therein.

Example 1

16.8 parts of 4-nitro-2-anisidine are diazotized in the usual manner and the diazocompound is combined with a solution of 34 parts of 2.3-hydroxynaphthoyl-4-amino-1.3-dimethoxybenzene in a dilute caustic soda solution containing Turkey red oil and an amount of sodium acetate sufficient for binding the excess of the mineral acid. The separated dyestuff is filtered off and washed. Mixed with the usual substrata it yields bluish red color lakes of a very good fastness to light.

Example 2

Cotton material previously treated in the usual manner is impregnated with a solution containing 6 grs. of 2.3-hydroxynaphthoyl-4-amino-1.3 dimethoxybenzene, 9 ccm. of a caustic soda solution of 34° Bé. and 9 ccm. of Turkey red oil in the liter, and developed, after having been squeezed off, with a diazo-solution containing 1.62 grs. of 2.4-dichloroaniline in the liter and having been neutralized with sodium acetate. The material is then worked up as usual.

In this manner yellowish red dyeings of a very good fastness to light are obtained.

When 2.3-hydroxynaphthoyl-4-amino-3-methoxy-1-ethoxy-benzene is used instead of 2.3-hydroxynaphthoyl-4-amino-1.3-dimethoxy-benzene dyeings of corresponding properties are obtained.

Example 3

Cotton material previously treated in the usual manner is impregnated with a solution containing 10 grs. of 2.3-hydroxynaphthoyl-4-amino-1.2-dimethoxybenzene, 15 ccm. of a caustic soda solution of 34° Bé. and 20 ccm. of Turkey red oil in the liter, and developed, after having been squeezed off, with a diazosolution containing 1.62 grs. of 2.5 dichloro-aniline in the liter and having been neutralized with sodium acetate. The material is then worked up as usual.

In this manner a brownish red dyeing of a very good fastness to light is obtained.

A brownish orange dyeing of a still better fastness to light is produced by using instead of 2.3-hydroxynaphthoyl-4-amino-1.2-dimethoxybenzene 2.3-hydroxynaphthoyl-4-amino-5-chloro-1.2-dimethoxybenzene. When these dyeings are aftertreated with copper salts, their fastness to light is further increased.

In the same manner 2.3-hydroxynaphthoyl-4-amino-2-methoxy-1-ethoxy-benzene can be used in the present process.

The following table gives the shades of some other dyestuffs derived from 2.3-hydroxynaphthoyl-4-amino-1.3-dimethoxy-benzene:

| Diazocompound of | Shade obtained |
|---|---|
| m-xylidine | Red |
| 4-chloro-2-toluidine | Red |
| 5-chloro-2-toluidine | Full red |
| 3-nitro-aniline | Brownish red |
| 4-nitro-2-toluidine | Clear red |
| 5-nitro-2-anisidine | Bluish claret |
| 4-amino-3.2-dimethyl-1.1'-azo-benzene | Garnet |
| dianisidine (subsequently treated with copper) | Reddish dark blue |
| m-chloroaniline | Yellowish red |
| 6-chloro-2-toluidine | Red |
| o-nitroaniline | Brownish red |
| 4-chloro-2-nitroaniline | Idem |
| 2-chloro-4-nitroaniline | Idem |
| 3-nitro-4-toluidine | Red |
| 5-nitro-2-toluidine | Claret |
| 1-aminoanthraquinone | Copper brown | derived from 2.3-hydroxynaphthoyl-4-amino-6-chloro-1.3-dimethoxy-benzene:

| Diazocompound of | Shade obtained |
|---|---|
| 4-chloro-2-toluidine | Red |
| 5-chloro-2-toluidine | Bluish red |
| 6-chloro-2-toluidine | Yellowish red |
| 2-amino-4-chloro-diphenylether | Claret |
| 2-amino-5-chloro-diphenylether | Bluish red |
| 3-nitroalinine | Yellowish red |
| 4-nitro-2-toluidine | Clear red |
| 4-nitro-2-anisidine | Clear red |
| 1-aminoanthraquinone | Claret brown |
| 2-phenetol-azo-α-naphthylamine | Black |
| 2.5-dichloroaniline | Brick-red |
| 2.4-dichloroaniline | Red |
| 3-nitro-4-toluidine | Yellowish red |
| 4-amino-3.2'-dimethyl-1.1'-azo-benzene | Bluish garnet | derived from 2.3-hydroxynaphthoyl-4-amino-6-methyl-1.3-dimethoxy-benzene:

| Diazocompound of | Shade obtained |
|---|---|
| m-xylidine | Clear bluish red |
| 2.5-dichloroaniline | Orange brown |
| 5-chloro-2-toluidine | Bluish red |
| 2.4.5-trichloro-aniline | Brownish red |
| 2-nitro-aniline | Red like claret |
| 4-chloro-5-bromo-2-toluidine | Dark bluish red |
| 3-nitro-4-toluidine | Red like claret |
| 5-nitro-2-anisidine | Dark bluish red like claret |
| 4-amino-3.2'-dimethyl-1.1'-azo-benzene | Bluish garnet |
| 1-amino-anthraquinone | Brownish red | derived from 2.3-hydroxynaphthoyl-4-amino-1.3.6-trimethoxy-benzene:

| Diazocompound of | Shade obtained |
|---|---|
| 5-chloro-2-toluidine | Red like claret |
| 4-nitro-2-toluidine | Brownish red |
| 4-nitro-2-anisidine | Red |
| 4-amino-3.2'-dimethyl-1.1' azobenzene | Bluish garnet |
| 1-aminoanthraquinone | Brownish red |
| 4'-nitro-2.5-dimethoxy-4-amino-azobenzene | Black | derived from 2.3-hydroxynaphthoyl-4-amino-1.2-dimethoxybenzene:

| Diazocompound of | Shade obtained |
|---|---|
| 3-chloroaniline | Copper |
| 4-nitro-2-toluidine | Yellowish red |
| 4-nitro-2-anisidine | Yellowish red |
| 4-amino-3.2' dimethyl-1.1' azo-benzene | Bluish garnet |
| 2-phenetol-azo-α-naphthylamine | Black |
| 4-chloro-2-anisidine | Claret |
| 5-chloro-2-toluidine | Red |
| 2-chloro-4-nitroaniline | Red brown |
| 3-nitro-4-toluidine | Brownish red |
| 5-nitro-2-toluidine | Idem |
| 1-aminoanthraquinone | Idem | derived from 2.3-hydroxynaphthoyl-4-amino-5-chloro-1.2-dimethoxybenzene:

| Diazocompound of | Shade obtained |
|---|---|
| 4-nitro-2-toluidine | Covered red |
| 6-chloro-2-toluidine | Covered red |
| 2-nitroaniline | Brown |
| 4-nitroaniline | Red-brown |
| 5-nitro-2-toluidine | Red-brown |
| 4-nitro-2-anisidine | Dark red |
| 5-nitro-2-anisidine | Brown garnet |
| 2-chloro-4-nitroaniline | Brown |
| 4-chloro-2-nitroaniline | Bluish red |
| 4-nitro-2-toluidine | Red |
| 4-amino-3.2' dimethyl-1.1' azobenzene | Garnet |
| 2-phenetol-azo-α-napthylamine | Blue black |

Since an object of the present invention is to provide dyestuffs of good fastness properties, which dyestuffs are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are the sulfonic acid, the carboxylic acid and the hydroxy group.

We claim:

1. As new compounds, the water-insoluble azodyestuffs corresponding probably to the general formula:

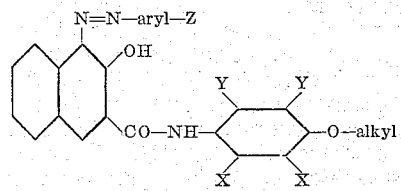

wherein one X and one Y mean hydrogen, the other X a methoxy group, the other Y hydrogen, halogen, an alkyl or alkoxy group, wherein Z stands for hydrogen, an aryl diazo radical of the benzene series or the residue

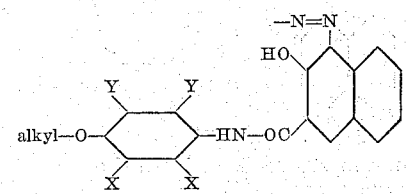

wherein X and Y have the above indicated meaning, which dyestuffs yield when mixed with the usual substrata valuable orange to red to blue to black color lakes and orange to red to blue to black dyeings fast to light when produced on the fiber.

2. As new compounds, the water-insoluble azodyestuffs corresponding probably to the general formula:

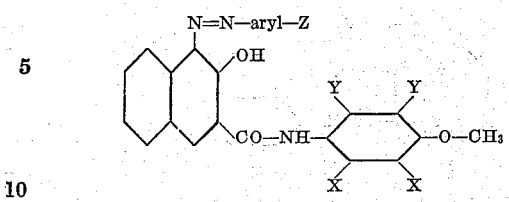

wherein one X and one Y mean hydrogen, the other X a methoxy-group, the other Y hydrogen, halogen, an alkyl or alkoxy-group, and wherein Z stands for hydrogen or an aryldiazo radical of the benzene series, which dyestuffs yield when mixed with the usual substrata valuable orange to red to blue to black color lakes and orange to red to blue to black dyeings fast to light when produced on the fiber.

3. As new compounds, the water-insoluble azo-dyestuffs corresponding probably to the general formula:

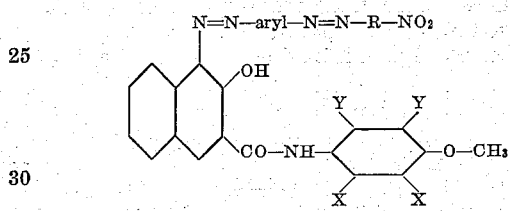

wherein one X and one Y mean hydrogen, the other X a methoxy-group, the other Y hydrogen, halogen, an alkyl or alkoxy-group and wherein R stands for a radical of the benzene series, which dyestuffs yield when mixed with the usual substrata valuable red to blue to black color lakes and red to blue to black dyeings fast to light when produced on the fiber.

4. As new compounds, the water-insoluble azo-dyestuffs corresponding probably to the general formula:

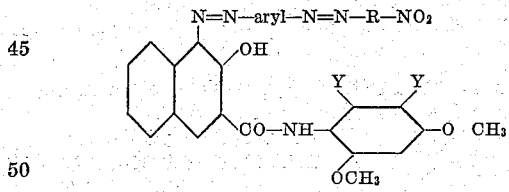

wherein one Y means hydrogen, the other Y hydrogen, halogen, an akyl or alkoxy group and wherein R stands for a radical of the benzene series, which dyestuffs yield when mixed with the usual substrata valuable red to blue to black color lakes and red to blue to black dyeings fast to light when produced on the fiber.

5. As new compounds, the water-insoluble azo-dyestuffs corresponding probably to the general formula:

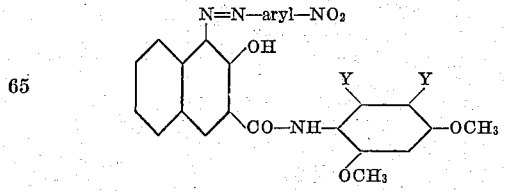

wherein one Y means hydrogen the other Y hydrogen, halogen, an alkyl- or alkoxy-group, which dyestuffs yield when mixed with the usual substrata valuable orange to red to blue to black color lakes and orange to red to blue to black dyeings fast to light when produced on the fiber.

6. As new compounds, the water-insoluble azo-dyestuffs corresponding probably to the general formula:

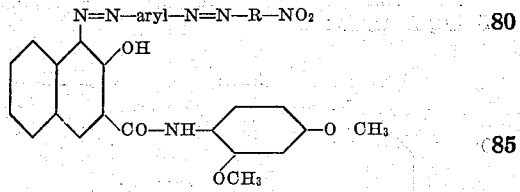

wherein R stands for a radical of the benzene series, which dyestuffs yield when mixed with the usual substrata valuable red to blue to black color lakes and red to blue to black dyeings fast to light when produced on the fiber.

7. As new compounds, the water-insoluble azo-dyestuffs corresponding probably to the general formula:

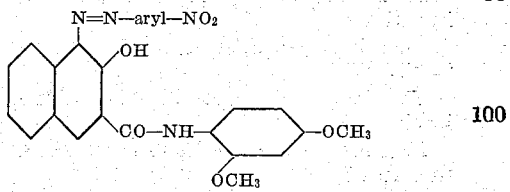

which dyestuffs yield when mixed with the usual substrata valuable orange to red to blue color lakes and orange to red to blue dyeings fast to light when produced on the fiber.

8. As new compounds, the water-insoluble azo-dyestuffs corresponding probably to the general formula:

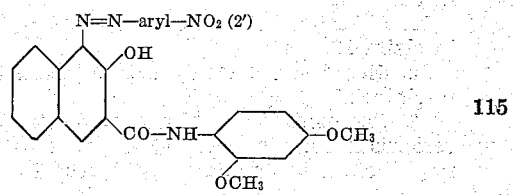

which dyestuffs yield when mixed with the usual substrata valuable orange to red to blue color lakes and orange to red to blue dyeings fast to light when produced on the fiber.

9. As a new compound, the water-insoluble azo-dyestuff corresponding probably to the following formula:

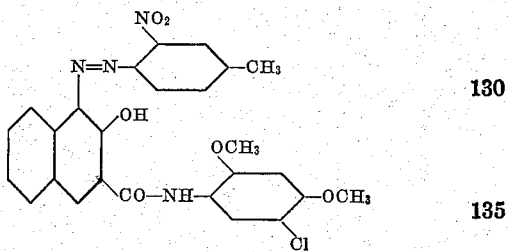

which dyestuff yields valuable red dyeings fast to light when produced on the fiber.

10. As a new compound, the water-insoluble azodyestuff corresponding probably to the following formula:

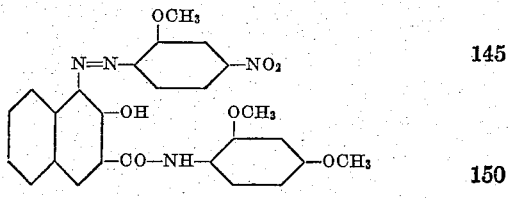

which dyestuff yields valuable bluish claret dyeings fast to light when produced on the fiber.

11. As a new compound, the water-insoluble azodyestuff corresponding probably to the following formula:

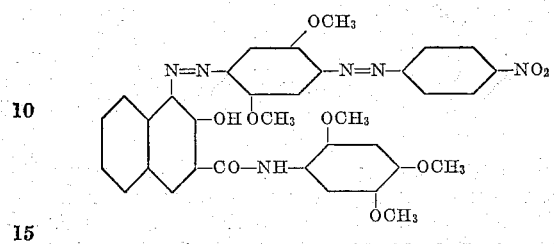

which dyestuff yields valuable black dyeings fast to light when produced on the fiber.

12. Fiber dyed with the azodyestuffs as claimed in claim 1.
13. Fiber dyed with the azodyestuffs as claimed in claim 2.
14. Fiber dyed with the azodyestuffs as claimed in claim 3.
15. Fiber dyed with the azodyestuffs as claimed in claim 4.
16. Fiber dyed with the azodyestuffs as claimed in claim 5.
17. Fiber dyed with the azodyestuffs as claimed in claim 6.
18. Fiber dyed with the azodyestuffs as claimed in claim 7.
19. Fiber dyed with the azodyestuffs as claimed in claim 8.
20. Fiber dyed with the azodyestuff as claimed in claim 9.
21. Fiber dyed with the azodyestuff as claimed in claim 10.
22. Fiber dyed with the azodyestuff as claimed in claim 11.
23. The method of making azo dyestuffs which comprises coupling an arylide of 2.3-hydroxynaphthoic acid having probably the formula

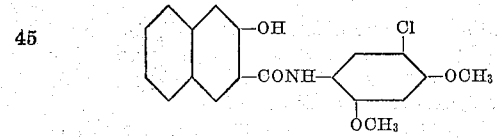

with a diazotized aromatic-amino compound.

24. An azo dyestuff having probably the formula

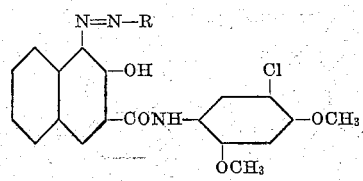

wherein R represents an aromatic radical from a diazotized aromatic amino compound.

25. An azo dyestuff having probably the formula:

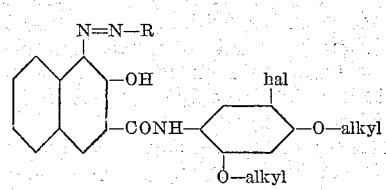

wherein R represents an aromatic radical from a diazotized aromatic amino compound.

26. An azo dyestuff having probably the formula:

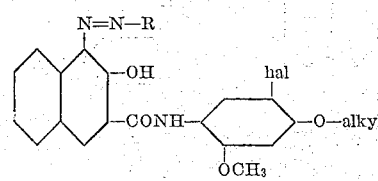

wherein R represents an aromatic radical from a diazotized aromatic amino compound.

27. An azo dyestuff having probably the formula:

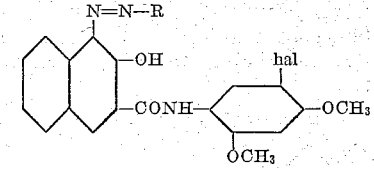

wherein R represents an aromatic radical from a diazotized aromatic amino compound.

LEOPOLD LASKA.
ARTHUR ZITSCHER.